United States Patent [19]
Carlson et al.

[11] Patent Number: 5,372,689
[45] Date of Patent: Dec. 13, 1994

[54] DUAL-DIRECTION FLOW MEMBRANE SUPPORT FOR WATER ELECTROLYZERS

[75] Inventors: Hugh A. Carlson, Windsted; Andrei Leonida, West Hartford; James F. McElroy, East Suffield; Eric M. Shane, Simsbury, all of Conn.

[73] Assignee: United Technologies Corporation, Hartford, Conn.

[21] Appl. No.: 210,795

[22] Filed: Mar. 18, 1994

Related U.S. Application Data

[62] Division of Ser. No. 892,152, Jun. 2, 1992, Pat. No. 5,296,109.

[51] Int. Cl.$^5$ .......................... C25B 9/00; C25B 15/00
[52] U.S. Cl. .................................. 204/252; 204/282; 204/283; 204/263
[58] Field of Search ........................ 204/252–258, 204/263–266, 282–283

[56] References Cited

U.S. PATENT DOCUMENTS

| | | | |
|---|---|---|---|
| 3,379,634 | 4/1968 | Rutkowski | 204/257 X |
| 4,331,523 | 5/1982 | Kawasaki | 204/283 X |
| 4,394,244 | 7/1983 | Divisek et al. | 204/282 X |
| 4,414,092 | 11/1983 | Lu et al. | 204/252 X |
| 4,444,639 | 4/1984 | Schurig et al. | 204/282 X |

*Primary Examiner*—Donald R. Valentine
*Attorney, Agent, or Firm*—McCormick, Paulding & Huber

[57] ABSTRACT

Due to the limited structural integrity of the ion exchange membrane, operation at pressure gradients exceeding about 200 psi can cause electrolyzer failure due to the ion exchange membrane being physically forced into the holes of the screen set forming the chamber on the lower pressure side of the ion exchange membrane. Utilizing a porous sheet between the anode electrode and the screen set provides additional structural integrity to the ion exchange membrane and allows simultaneous dual-directional flow of water to the anode electrode while oxygen flows from the anode electrode, thereby allowing high pressure gradient operation.

11 Claims, 3 Drawing Sheets

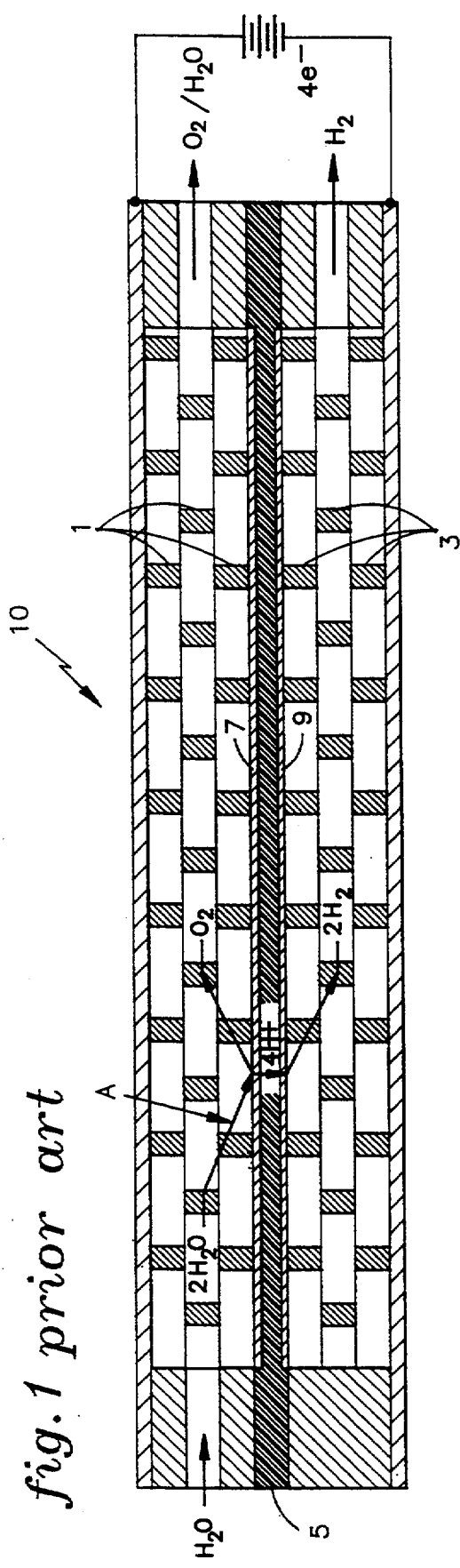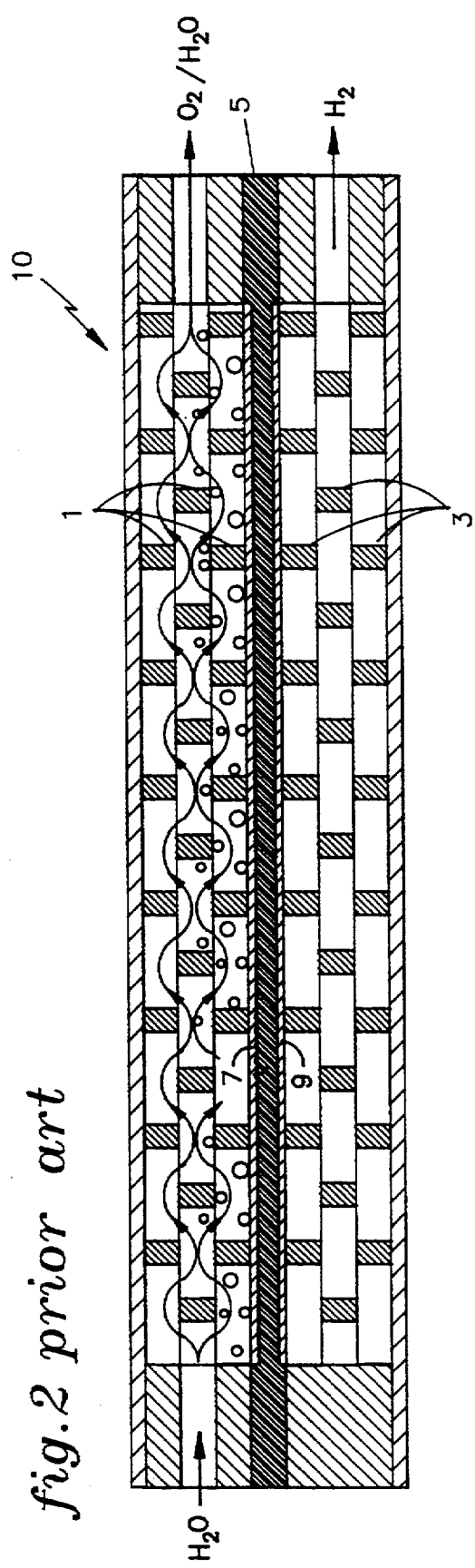
fig.1 prior art
fig.2 prior art

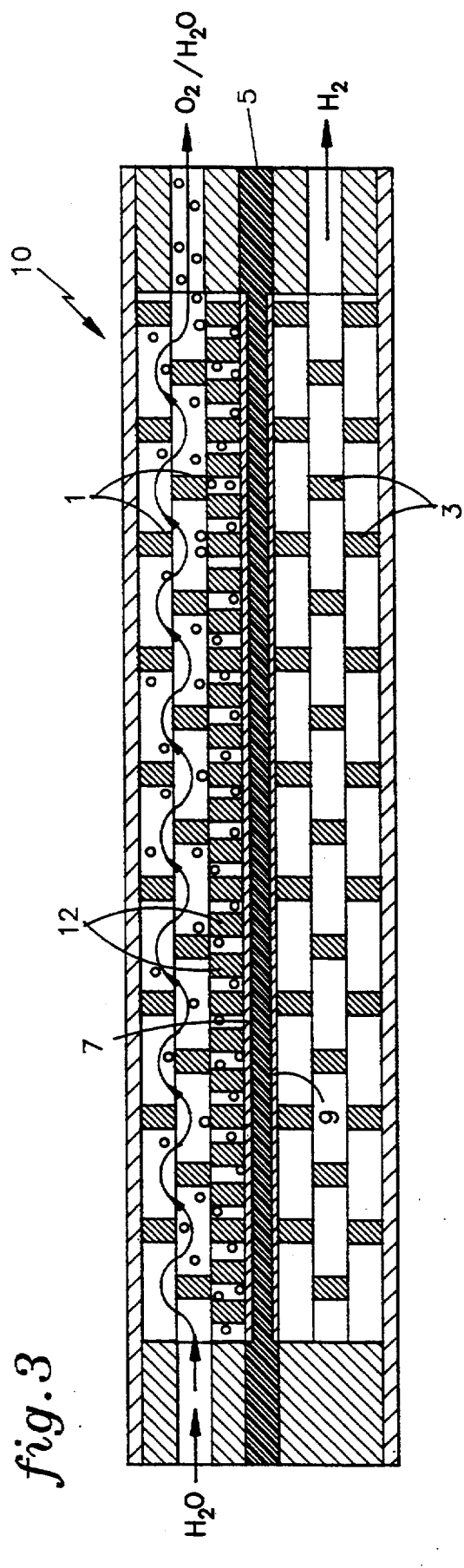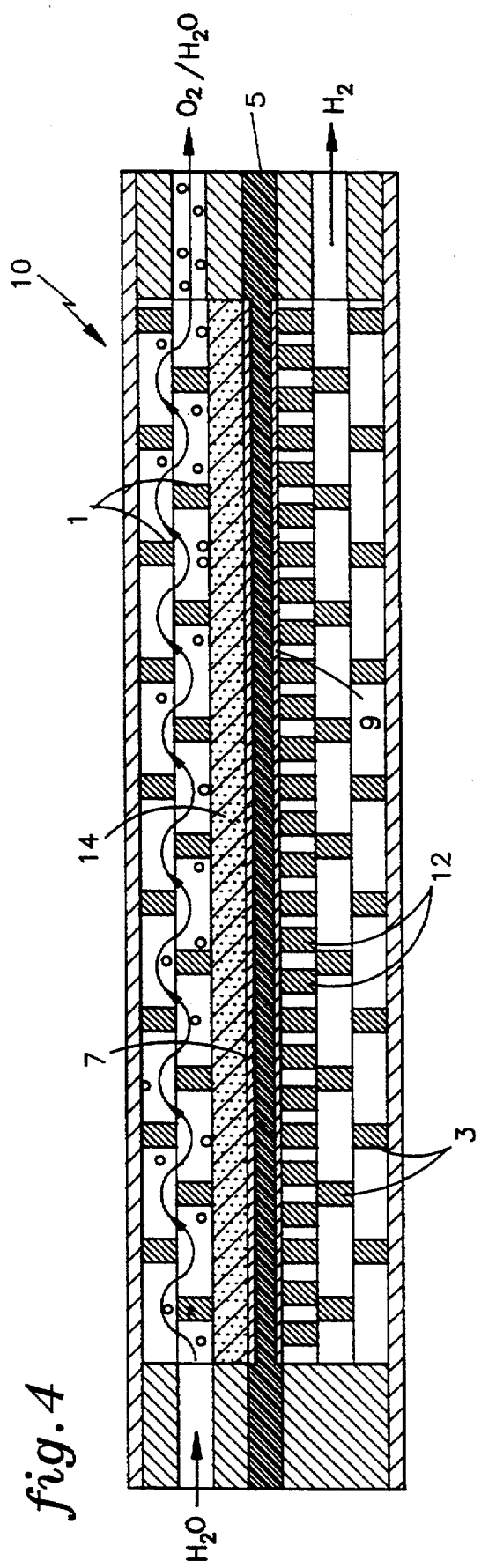

DUAL-DIRECTION FLOW MEMBRANE SUPPORT FOR WATER ELECTROLYZERS

This is a division of copending application Ser. No. 07/892,152 filed on Jun. 2, 1992, now U.S. Pat. No. 5,296,109.

TECHNICAL FIELD

The present invention relates to water electrolyzers, and especially to water electrolyzers which can operate under high pressure gradients.

BACKGROUND OF THE INVENTION

Ion exchange membrane water electrolyzers for producing hydrogen and oxygen from water have been known for more than 20 years. The electrolyzer's components typically include chambers for the introduction of water and the removal of hydrogen, oxygen, and water, an ion exchange membrane disposed between catalyst electrodes, and metal screens which support the ion exchange membrane and form the chambers. Referring to FIG. 1 which is illustrative of a common water electrolyzer component arrangement, a first metal screen set 1 which forms the anode chamber is located above the catalytic anode electrode 7 which intimately contacts the ion exchange membrane 5. The opposite side of the ion exchange membrane 5 intimately contacts a catalytic cathode electrode 9, which lies above a second metal screen set 3 which forms the cathode chamber.

During operation, water enters the anode chamber formed by the first metal screen set 1. The water passes through the first metal screen set 1 and intimately contacts the anode electrode 7. At the anode electrode 7, electrolysis converts the water to hydrogen ions and oxygen. These hydrogen ions migrate across the ion exchange membrane 5 while the oxygen passes through the first metal screen set 1, enters the water stream, and exits the electrolyzer 10. Once across the ion exchange membrane 5, the hydrogen ions form molecular hydrogen at the cathode electrode 9 and exit the electrolyzer 10 through the second metal screen set 3. This reaction mechanism is shown in FIG. 1, mechanism A.

The metal screens of the water electrolyzer perform numerous functions. Generally, a low pressure gradient is permitted across the ion exchange membrane within the electrolyzer in order to simplify the system pressure controls. Often, up to about 200 pounds per square inch (psi) of pressure exists across the ion exchange membrane during electrolyzer operation. Since the ion exchange membrane possesses low structural integrity, the pressure gradient across the ion exchange membrane can cause failure thereof. Therefore, the metal screens are used to provide structural support to the ion exchange membrane during operation. These metal screens also form flow paths for the water, oxygen, and hydrogen, and they conduct electrons utilized during the water electrolysis to and from the electrodes, into adjacent cells, or to external circuits.

Although a water electrolyzer utilizing the configuration described above forms a performance stable base line cell at 1000 amperes per square foot (ASF) and 120° F., higher pressure differential operation is desired. Operation at higher pressure differentials will simplify the electrolysis process in many ways including simplification or elimination of pressure control equipment and lower pressure components (on one side). However, under increased pressure differentials, the metal screens fail to provide the necessary structural integrity to the ion exchange membrane. At pressure differentials exceeding about 400 psi, the ion exchange membrane can extrude into the metal screen located on the side of the ion exchange membrane having the lower pressure, thereby causing electrolyzer failure. Referring to FIG. 2, operation above about a 10 psi pressure gradient can deform the ion exchange membrane 5 and force it into the metal screen set 1 on the side of the ion exchange membrane 5 having the lower pressure.

What is needed in the art is a water electrolyzer which is capable of operation at high pressure differentials.

DISCLOSURE OF INVENTION

The present invention relates to a water electrolyzer. This water electrolyzer comprises an anode electrode, an anode chamber formed by a first screen set superimposed on said anode electrode, a cathode electrode, a cathode chamber formed by a second screen set superimposed on said cathode electrode, an ion exchange membrane disposed between and in intimate contact with said anode electrode and said cathode electrode, and a porous sheet interposed between and in intimate contact with the first screen set and the anode electrode.

The present invention further relates to a method for electrolyzing water using a water electrolyzer. This method includes introducing water to the anode chamber of the electrolyzer. The water passes through pores of the sheet to the anode electrode where it is electrolyzed to oxygen and hydrogen ions. The hydrogen ions migrate across the ion exchange membrane to the cathode electrode where they form molecular hydrogen. This molecular hydrogen exits the electrolyzer through the cathode chamber while the oxygen exits the electrolyzer by passing through the pores of the sheet and then out through the anode chamber.

The foregoing and other features and advantages of the present invention will become more apparent from the following description and accompanying drawings.

BRIEF DESCRIPTION OF THE DRAWINGS

FIG. 1 is an illustration of a basic prior art ion exchange membrane water electrolyzer.

FIG. 2 is an illustration of a basic prior art ion exchange membrane water electrolyzer and the flow path through this electrolyzer.

FIG. 3 is a water electrolyzer which uses metal screen set to form the anode and the cathode chambers and further uses a fine mesh screen to provide additional support for the ion exchange membrane.

FIG. 4 is one embodiment of the water electrolyzer of the present invention using metal screen sets to form the anode and cathode chambers with a porous sheet located between the anode chamber and the anode electrode.

BEST MODE FOR CARRYING OUT THE INVENTION

Figure 5:
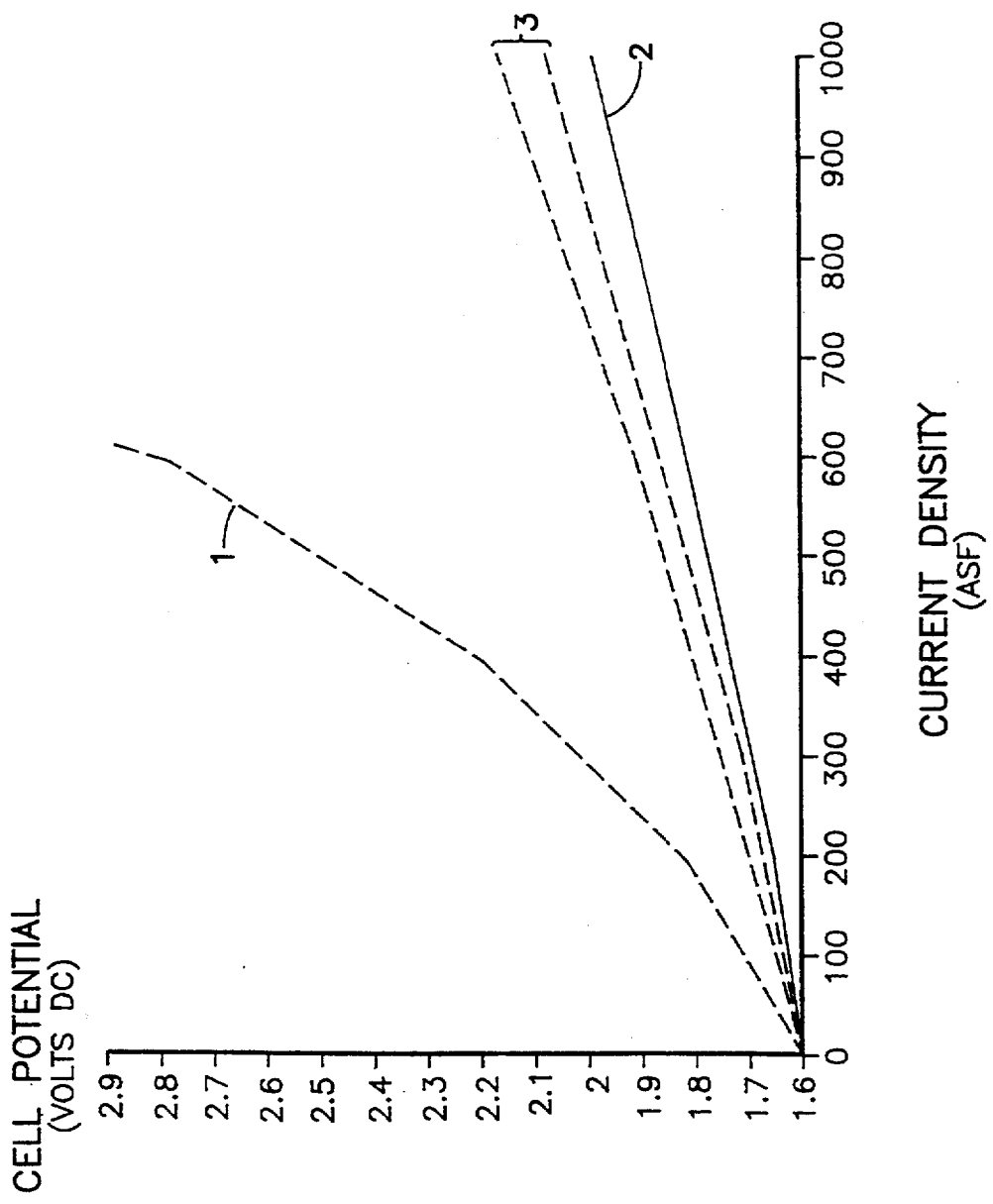
FIG. 5 is a graph of the water electrolyzer performance which was realized using various supports including the prior art metal screen, the fine mesh screen, and finally the porous sheet of the present invention.

The present invention relates to a water electrolyzer capable of operating at ion exchange membrane pressure gradients up to about 2000 psi and greater. The electrolyzer components include metal screens, a porous sheet, an anode electrode, an ion exchange membrane, and a cathode electrode. At pressure gradients exceeding about 200 psi, the ion exchange membrane requires additional support to avoid extruding into the metal screens. The additional ion exchange membrane support can be provided by employing fine mesh screens and/or porous sheets.

The fine mesh screens should be electrically conductive, and therefore are generally metal screens having a mesh size of about 5/0 to about 6/0. Additionally, these fine mesh screens are capable of providing structural integrity to the ion exchange membrane at pressure differentials exceeding about 200 psi, and typically up to about 1000 psi or greater. Some possible fine mesh screens include titanium, zirconium, tantalum, and niobium expanded metal screens produced by X-MET Corporation, Bridgeport, Conn. among others. These fine mesh screens typically have a thickness of about 0.05 millimeters (mm) to about 0.3 mm. Although thicker fine mesh screens are feasible, they are impractical due to decreased mass transfer rates in these thicker screens.

Even though these fine mesh screens provide structural integrity to the ion exchange membrane, they inhibit the water flow and therefore decrease the electrolyzer efficiency. FIG. 3, which is meant to be exemplary, not limiting, explains this phenomenon. At startup of the electrolyzer 10, water passes through the holes of the metal screen set 1 and the holes of the fine mesh screen 12 to the anode electrode 7 where electrolysis converts the water to hydrogen ions and oxygen. This oxygen then occupies the holes of the fine mesh screen 12, thereby inhibiting the access of additional water to the anode electrode 7. The fine mesh screen 12 allows uni-directional flow, thereby only allowing the flow of the oxygen from the anode electrode 7 through the fine mesh screen 12 to the metal screen set 1 while inhibiting water flow to the anode electrode 7. As a result, water only gains access to the anode electrode 7 after the oxygen has passed through the fine mesh screen 12 to the metal screen set 1. This inability of the water to reach the anode electrode 7 causes the electrolysis rates and therefore the electrolyzer efficiency to decrease.

With the porous sheets, as shown in FIG. 4, which is meant to be exemplary, not limiting, oxygen produced at the anode electrode 7 escapes through the pores of the porous sheet 14 while additional water flows to the anode electrode 7 for electrolysis. The porous sheet 14 is perforated having multiple-pore sizes. Water wicks from the metal screen set X, through the porous sheet 14, to the anode electrode 7. On the anode electrode 7, electrolysis converts the water to oxygen and hydrogen ions. This oxygen then passes from the anode electrode 7, through the larger pores of the porous sheet 14, to the metal screen set 1. Meanwhile, additional water is wicked through some of the smaller pores of the porous sheet 14 to the anode electrode 7 for additional electrolysis.

The porous sheet 14 establishes a simultaneous, dual-directional flow since the smaller pores allow water to be wicked to the anode electrode 7 while the larger pores simultaneously allow oxygen to pass from the anode electrode 7 to the metal screen set 1. As a result, the porous sheet can provide the necessary support for the ion exchange membrane during high pressure gradient operation without compromising the efficiency of the electrolyzer 10.

The porous sheet should be composed of an electrically conductive compound capable of being formed into a thin sheet having multiple pore sizes, of allowing simultaneous, dual-directional flow such that the passage of oxygen or hydrogen (depending upon the side of the ion exchange membrane) occurs simultaneously with the passage of water, and of supporting the ion exchange membrane under high pressure gradient conditions. Additionally, compatibility of the porous sheet with an oxygen and water or hydrogen and water environment is important. Typically, this porous sheet is a metal such as carbon, niobium, tantalum, titanium, zirconium, mixtures thereof, and others. The sheet thickness can range from about 0.127 mm to about 0.635 mm with a thickness of about 0.293 mm to about 0.305 mm preferred. Although thicker membranes provide additional support, they possess lower mass transfer rates and therefore decreased water transport rates and electrolyzer efficiency. The pore size of the porous sheet is dependent upon the size of the molecules which must pass through these pores. Pore sizes ranging from about 10 microns to about 14 microns have proven useful. Since porosities exceeding 60% tend to decrease the strength of the porous sheet and therefore its ability to provide structural integrity to the ion exchange membrane, and since porosities below about 40% inhibit the flow of the water and oxygen or hydrogen to and from the respective electrode, the porosity of the porous sheet typically ranges from about 40% to about 60%.

Since water electrolysis requires the conversion of water to hydrogen ions and oxygen using electricity, the electrical conductivity of the porous sheet is also important. Therefore, the porous sheet electrical conductivity can be improved by electroplating it with a conductive metal. Typically a metal conventionally used to form the anode and cathode electrodes can be utilized for electroplating purposes. A few of the possible electroplating metals include gold, iridium, palladium, platinum, rhodium, ruthenium, and mixtures thereof, among others, with platinum preferred. Generally, the porous sheets are fine spotted using conventional electroplating techniques with about 0.05 milligrams per square centimeter ($mg/cm^2$) to about 0.2 $mg/cm^2$ of the electroplating metal, with about 0.07 $mg/cm^2$ to about 0.12 $mg/cm^2$ preferred.

These porous sheets can be interposed between the anode electrode, cathode electrode, or both, and the metal screen sets, depending upon where dual-directional flow is needed and the amount of support necessary. For example, submarine electrolyzers preferably utilize the porous sheets interposed between the anode electrode and the metal screen set forming the anode chamber, while aircraft electrolyzers preferably utilize the porous sheets interposed between the cathode electrode and the metal screen set forming the cathode chamber.

In the submarine electrolyzer, the ship directly receives low pressure metabolic oxygen from the electrolyzer while the hydrogen is delivered to discharge at sea depth pressure. Therefore, the ion exchange membrane cathode side pressure exceeds the anode side pressure, resulting in a pressure gradient up to about 1,000 psi. If the ion exchange membrane is not supported by the porous sheet, it potentially can be extruded into the metal screen set on the anode side causing ion exchange membrane and electrolyzer failure. On the other hand, in an aircraft 200 psi oxygen recharge system, hydrogen at about 20 psi, reacts with ambient air at altitude pressure (i.e. cabin pressure). Therefore, the ion exchange membrane anode side pressure exceeds the cathode side pressure, resulting in a pressure gradient up to about 2,000 psi. Again, the potential for ion exchange membrane failure is created without porous sheet support of the ion exchange membrane on the cathode side.

Beside the fine mesh screens and the porous sheets, the other components of the electrolyzer can be conventional. Conventional anode and cathode electrodes include metal and metal alloys of noble metals, such as iridium based, palladium based, platinum based, rhodium based, and ruthenium based metals, mixtures thereof, and other catalytic metals known in the art. Conventional electrolyzer ion exchange membranes allow hydrogen ion migration from the anode electrode to the cathode electrode. Typical long life ion exchange membranes are of the perfluorocarbon sulfonic acid type due to their electrochemical stability. One such perfluorocarbon sulfonic acid membrane is Nafion® produced by E.I. dupont de Nemours & Co. (Inc.), Wilmington, Del. Similar perfluorocarbon sulfonic acid membranes are produced by Dow Chemical and others.

Conventional metal screens include screens having a thickness and a mesh size determined on the basis of mass flow rates, pressure, and temperature conditions. Typically, these metal screens have a mesh size of about 2/0 to about 6/0, with about 2/0 to about 4/0 preferred. The metal screen thickness typically ranges from about 0.05 mm to about 0.5 mm, with about 0.05 mm to about 0.3 mm preferred.

Operation of one embodiment of the water electrolyzer of the present invention comprises introduction of water to the anode chamber. The water passes through the metal screen set, through the porous sheet, and intimately contacts the anode electrode. On the anode electrode, electrolysis converts the water to hydrogen ions and oxygen. The hydrogen ions migrate across the ion exchange membrane to the cathode electrode, form molecular hydrogen at the cathode electrode, and exit the electrolyzer through the cathode chamber as molecular hydrogen. Meanwhile the oxygen passes from the anode electrode through the larger pores in the porous sheet, through the metal screen set, and exits the electrolyzer as additional water simultaneously passes through the metal screen set and through the porous sheet to the anode electrode.

It should be noted that one or a plurality of porous sheets can be utilized on one or both sides of the ion exchange membrane depending upon where and the amount of support required. Furthermore, where additional support is needed on both sides of the ion exchange membrane yet only one side of the ion exchange membrane requires dual directional flow, one or a plurality of fine screens can be used with one or a plurality of porous sheets on the respective sides of the ion exchange membrane. Therefore, the arrangement of the electrolyzer could be (referring to FIG. 4) metal screen set 1, porous sheet 14, anode electrode 7, ion exchange membrane 5, cathode electrode 9, fine mesh screen 12, second metal screen set 3. This arrangement would allow the dual-directional flow necessary for the passage of water and oxygen and also allow uni-directional flow of the hydrogen while increasing the structural integrity of both sides of the ion exchange membrane.

The advantages of the present invention range from improved structural integrity and the ability to successfully operate under high pressure gradient conditions to improved cell performance under all practical pressure gradient conditions. These pressure gradients include gradients up to about 6000 psi and possibly greater.

Referring to the experimental data in FIG. 5, which is meant to be exemplary, not limiting, the difference in performance between an electrolyzer using a metal screen set (Line 3), a fine mesh screen (Line 1), and a porous sheet (Line 2) can be seen. The fine mesh screen electrolyzer performance was significantly poorer than that of the metal screen set electrolyzer. The fine mesh screen electrolyzer only maintained a cell potential below 2 volts (DC) at a current density below about 250 ASF (Line X) while the metal screen set electrolyzer maintained a cell potential below 2 volts up to a current density of about 730 ASF to about 830 ASF (Line 3). In contrast, the porous sheet electrolyzer maintained a current density below 2 volts at a higher current density and higher pressure gradient ($\Delta P$) than the metal screen set electrolyzer; a $\Delta P$ of 750 psi and a current density of about 1000 ASF at 2 volts (Line 2) versus a $\Delta P$ below 200 psi and a current density below about 830 ASF (Line 3), respectively. Note, the fine mesh screen and the porous sheet electrolyzers operated at $\Delta P$ of about 750 pounds per square inch (psi) while the metal screen set electrolyzer operated below about 200 psi $\Delta P$.

Successful operation of prior art ion exchange membrane electrolyzers at pressure gradients between about 25 psi and about 200 psi required the use of significant additional pressure control equipment and typically sacrificed electrolyzer performance. The ion exchange membrane electrolyzer of the present invention is capable of operating at pressure gradients up to about 6,000 psi without the use of additional equipment, and without sacrificing electrolyzer performance. Furthermore, the electrolyzer performance of the present invention is superior to that of the prior art over a wide range of pressures and current densities; from about 100 psi to about 3,000 psi and greater, and from about 100 ASF to about 2,000 ASF.

Although this invention has been shown and described with respect to detailed embodiments thereof, it would be understood by those skilled in the art that various changes in form and detail thereof maybe made without departing from the spirit and scope of the claimed invention.

We claim:

1. A water electrolyzer, comprising:
   a. an anode electrode;
   b. an anode chamber formed by a first screen set superimposed on said anode electrode;
   c. a cathode electrode;
   d. a cathode chamber formed by a second screen set superimposed on said cathode electrode;
   e. an ion exchange membrane disposed between and in intimate contact with said anode electrode and said cathode electrode; and
   f. a porous sheet constructed and arranged for dual directional flow and for supporting said ion exchange membrane, said porous sheet interposed between said first screen set and said anode electrode.

2. A water electrolyzer as in claim 1 further comprising a second porous sheet for supporting said ion exchange membrane interposed between said second screen set and said cathode electrode.

3. A water electrolyzer as in claim 1 further comprising a fine mesh screen for supporting said ion exchange membrane interposed between said second screen set and said cathode electrode.

4. A water electrolyzer as in claim 1 wherein said porous sheet is carbon, niobium, tantalum, titanium, zirconium, or mixtures thereof.

5. A water electrolyzer as in claim 1 wherein said porous sheet has a mean pore size between about 10 microns and about 14 microns and has a porosity between about 40% and about 60%.

6. A water electrolyzer as in claim 1 wherein said porous sheet is electroplated with platinum.

7. A water electrolyzer, comprising:
   a. an anode electrode;
   b. an anode chamber formed by a first screen set superimposed on said anode electrode;
   c. a cathode electrode;
   d. a cathode chamber formed by a second screen set superimposed on said cathode electrode;
   e. an ion exchange membrane disposed between and in intimate contact with said anode electrode and said cathode electrode;
   f. a porous sheet constructed and arranged for dual directional flow and for supporting said ion exchange membrane, said porous sheet interposed between said second screen set and said cathode electrode.

8. A water electrolyzer as in claim 7 wherein said porous sheet is carbon, niobium, tantalum, titanium, zirconium, or mixtures thereof.

9. A water electrolyzer as in claim 7 wherein said porous sheet has a mean pore size between about 10 microns and about 14 microns and has a porosity between about 40% and about 60%.

10. A water electrolyzer as in claim 7 wherein said porous sheet is electroplated with platinum.

11. A water electrolyzer as in claim 7 further comprising a fine mesh screen for supporting said ion exchange membrane interposed between said anode electrode and said first screen set.

* * * * *